(12) United States Patent
Deng (10) Patent No.: US 11,533,368 B2
(45) Date of Patent: Dec. 20, 2022

(54) AUGMENTED REALITY INFORMATION TRANSMISSION SYSTEM AND METHOD

(71) Applicant: HTC Corporation, Taoyuan (TW)

(72) Inventor: Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 213 days.

(21) Appl. No.: 16/826,295

(22) Filed: Mar. 23, 2020

(65) Prior Publication Data

US 2020/0336568 A1    Oct. 22, 2020

Related U.S. Application Data

(60) Provisional application No. 62/822,055, filed on Mar. 22, 2019.

(51) Int. Cl.
  *H04W 72/10* (2009.01)
  *H04L 67/131* (2022.01)
  *G06T 19/00* (2011.01)

(52) U.S. Cl.
  CPC .......... *H04L 67/131* (2022.05); *G06T 19/006* (2013.01); *H04W 72/10* (2013.01)

(58) Field of Classification Search
  CPC ....... H04L 67/38; G06T 19/006; H04W 72/10
  USPC ........................................................ 709/203
  See application file for complete search history.

(56) References Cited

U.S. PATENT DOCUMENTS

| | | | | |
|---|---|---|---|---|
| 2010/0225583 | A1* | 9/2010 | Ohta | A63F 13/219 345/158 |
| 2016/0005233 | A1 | 1/2016 | Fraccaroli et al. | |
| 2016/0171767 | A1* | 6/2016 | Anderson | G06F 3/011 345/633 |
| 2018/0024362 | A1 | 1/2018 | Williamson | |
| 2018/0218545 | A1* | 8/2018 | Garcia | G06F 3/0346 |
| 2018/0330543 | A1 | 11/2018 | Shand | |

FOREIGN PATENT DOCUMENTS

| | | |
|---|---|---|
| CN | 102759985 | 10/2012 |
| CN | 205287575 | 6/2016 |
| CN | 106354253 | 1/2017 |
| CN | 106471438 | 3/2017 |
| CN | 107852567 | 3/2018 |
| CN | 109144239 | 1/2019 |
| TW | I594643 | 8/2017 |
| WO | 2018118661 | 6/2018 |

OTHER PUBLICATIONS

"Office Action of Taiwan Counterpart Application", dated Apr. 9, 2021, p. 1-p. 8.
Office Action of China Counterpart Application, dated Jun. 11, 2021, pp. 1-7.
"Office Action of China Counterpart Application", dated Jan. 28, 2022, p. 1-p. 6.

* cited by examiner

*Primary Examiner* — Sibte H Bukhari
(74) *Attorney, Agent, or Firm* — JCIPRNET (57) ABSTRACT

The disclosure provides an augmented reality (AR) information transmission system and an AR information transmission method. The AR information transmission system includes a wireless information transmission device. The wireless information transmission device includes a directivity transmitter and a processor. The processor is configured to: obtain AR information and convert the AR information into a wireless signal; and control the directivity transmitter to send the wireless signal toward a designated direction.

9 Claims, 6 Drawing Sheets

AUGMENTED REALITY INFORMATION TRANSMISSION SYSTEM AND METHOD

CROSS-REFERENCE TO RELATED APPLICATION

This application claims the priority benefit of U.S. provisional application Ser. No. 62/822,055, filed on Mar. 22, 2019. The entirety of the above-mentioned patent application is hereby incorporated by reference herein and made a part of this specification.

BACKGROUND

Technical Field

The disclosure relates to a technology of an augmented reality (AR), and particularly to an AR information transmission system and an AR information transmission method.

Description of Related Art

Along with technological development, AR technology has become one of the most popular research issues at the time. The most common way of using an AR device (such as AR glasses) among the conventional technology is to have the user decide the contents on the relevant operating platforms (such as a navigation device or a smart device), which are then presented to the user by an AR device.

However, such way of operation is not intuitive for the user. Furthermore, beside that the switching of the contents requires to be commanded by voice or manually, when the user switches from one content to another, the user may also experience a period of delay before setting eyes on the required information.

Hence, for persons skilled in the art, it is a critical task to design a rapid and intuitive mechanism to provide AR information.

SUMMARY

In light of this, the disclosure provides an augmented reality (AR) information transmission system and an AR information transmission method to solve the above technical problems.

The disclosure provides an AR information transmission system, which includes a first wireless information transmission device. The first wireless information transmission device includes a first directivity transmitter and a first processor. The first processor is coupled to the first directivity transmitter and is configured to: obtain a first AR information and convert the first AR information into a first wireless signal; and control the first directivity transmitter to send the first wireless signal toward at least one first designated direction.

The disclosure provides an AR information transmission method, including: obtaining a first AR information and converting the first AR information into a first wireless signal by a first wireless information transmission device; sending the first wireless signal toward at least one first designated direction by a first directivity transmitter of the first wireless information transmission device.

Based on the above, the disclosure enables the wearer of the AR device to seamlessly view the AR information provided by the wireless information transmission device in an intuitive and simple way with low latency.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
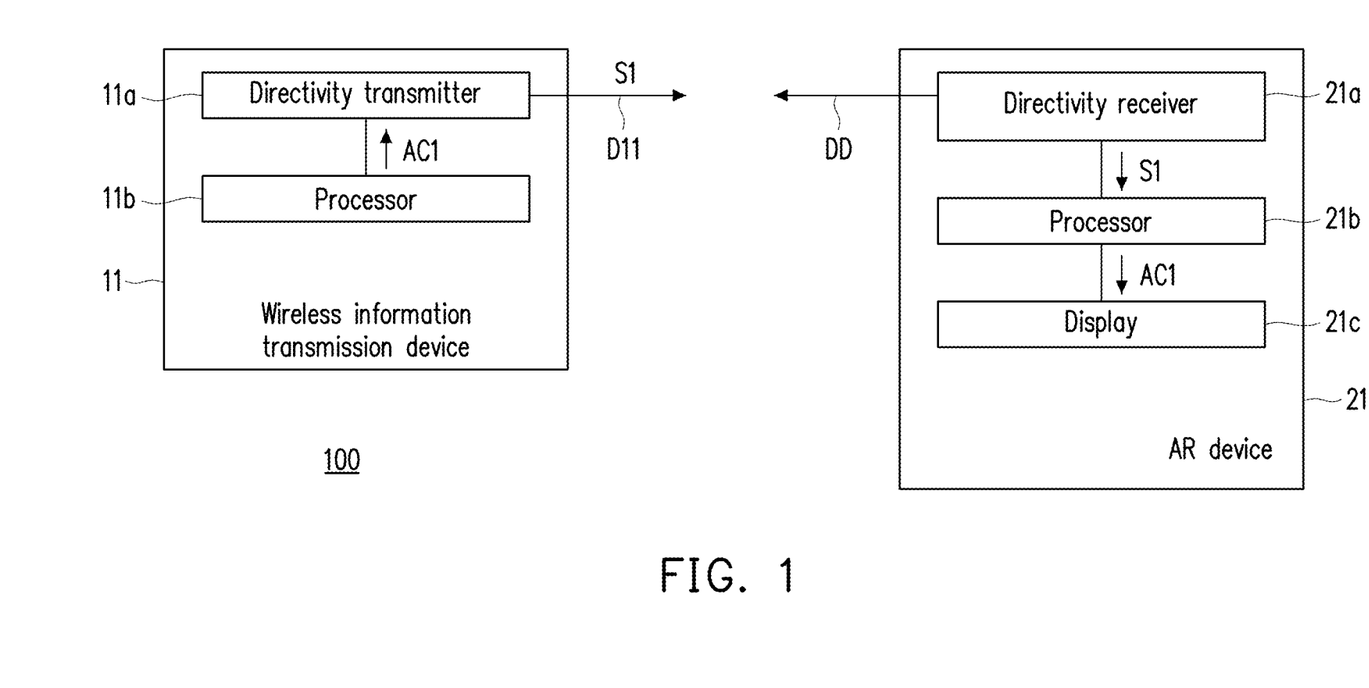
FIG. 1 is a schematic view of an AR information transmission system according to an embodiment of the disclosure.

Please refer to FIG. 1. FIG. 1 is a schematic view of an augmented reality (AR) information transmission system according to an embodiment of the disclosure. As shown in FIG. 1, an AR information transmission system 100 may include a wireless information transmission device 11 and an AR device 21. In a different embodiment, the wireless information transmission device 11 may be configured to, for example, provide specific AR information to the AR device 21, and the specific AR information may include, without being limited to, television broadcast, weather forecast, reminder lists, caller identification, and the like.

As shown in FIG. 1, the wireless information transmission device 11 may include a directivity transmitter 11*a* and a processor 11*b*. In the embodiments of the disclosure, the directivity transmitter 11*a* is configured to, for example, send a signal toward at least one designated direction (for example, a designated direction D11), in which a directivity antenna or other similar directivity transmission elements may be included, but the disclosure is not limited thereto.

The processor 11*b* is coupled to the directivity transmitter 11*a* and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kinds of integrated circuit, a state machine, a processor based on an advanced RISC machine (ARM), and the like.

In the embodiments of the disclosure, the processor 11*a* may be configured to obtain required AR information AC1. In some embodiments, the processor 11*a* may obtain the AR information AC1 from connected network resources or smart devices. For example, if the AR information AC1 is a weather forecast, then the processor 11*a* may obtain the required weather forecast information after connecting to relevant weather forecast websites to produce the AR information AC1. For another example, if the AR information AC1 is a reminder list of the user, then the processor 11*a* may obtain the required reminder list after connecting to the user's smart device to produce the AR information AC1. But the disclosure is not limited thereto.

After obtaining the required AR information AC1, the processor 11a may convert the AR information AC1 into a wireless signal S1 and control the directivity transmitter 11a to send the wireless signal S1 toward the first designated direction. In some embodiments, the user may adjust the direction in which the wireless information transmission device 11 sends the wireless signal S1 by adjusting the placement of the wireless information transmission device 11. For example, the designated direction D11 may be the front of the wireless information transmission device 11, and by turning the direction of the wireless information transmission device 11, the facing direction of the wireless information transmission device 11 may be altered, thereby changing the designated direction D11. But the disclosure is not limited thereto.

As shown in FIG. 1, the AR device 21 includes a directivity receiver 21a, a processor 21b, and a display 21c. In an embodiment, the directivity receiver 21a is configured to, for example, receive a signal from the specific direction DD, in which a directivity antenna or other similar directivity transmission elements may be included. But the disclosure is not limited thereto. In some embodiments, the specific direction DD is, for example, the front of the AR device 21. For example, if the AR device 21 is a pair of AR glasses, then the specific direction DD is, for example, the front of the AR glasses, that is, the direction to which the wearer of the AR glasses faces, but the disclosure is not limited thereto.

In addition, regarding the possible embodiments of the processor 21b, one may refer to the relevant explanation of the processor 11a, and the details are not described herein. Also, the display 21c may be, for example, a display interface configured for the AR device 21 to present AR information/AR contents, such as the lenses of the AR glasses, but the disclosure is not limited thereto.

For ease of illustration, the AR glasses are taken as an example of the AR device 21 hereinafter, but they do not limit the possible embodiments of the disclosure.

In an embodiment, it is assumed that the wireless information transmission device 11 is placed in the left front of the wearer (hereafter a wearer A) of the AR device 21, and the designated direction D11 in which the wireless information transmission device 11 sends the wireless signal S1 is adjusted to direct toward the wearer A of the AR device 21. Under this circumstance, if the wearer A wearing the AR device 21 faces straight ahead, then under the circumstance that the directivity receiver 21a may only receive the signal from the front of the wearer A, the directivity receiver 21a cannot receive the wireless signal S1.

However, if the wearer A turns his head and faces toward his left front (i.e., the direction in which the wireless information transmission device 11 is located), the directivity receiver 21a may then receive the wireless signal S1 from the directivity transmitter 11a. Under this situation, the processor 21b may obtain the wireless signal S1 from the directivity receiver 21a and convert the wireless signal S1 into the AR information AC1. In a different embodiment, the processor 21b may adopt a corresponding decoding method according to the encoding method of the wireless signal S1 to reduce the wireless signal S1 into an AR information AC1, but the disclosure is not limited thereto.

After that, the processor 21b may control the display 21c to display the AR information AC1. For example, the processor 21b may display the AR information AC1 on the lenses of the AR device 21 (such as the AR glasses) for the wearer A to watch.

Then, when the wearer A turns his head back to face straight ahead, since the directivity receiver 21a can no longer receive the wireless signal S1, the processor 21b may control the display 21c to stop displaying the AR information AC1.

In other words, for the wearer A, when he wants to watch the AR information AC1 provided by the wireless information transmission device 11, he only needs to turn his head toward his left front (that is, the direction in which the wireless signal S1 can be received) to have the AR device 21 present the AR information AC1. And when the wearer A wants to stop watching the AR information AC1, he only needs to turn his head to a direction in which the wireless signal S1 cannot be received (for example, his direction straight ahead) to have the AR device 21 stop displaying the AR information AC1.

Based on the above, the disclosure enables the wearer of the AR device to seamlessly view the required AR information in a more intuitive and efficient way.

Figure 2:
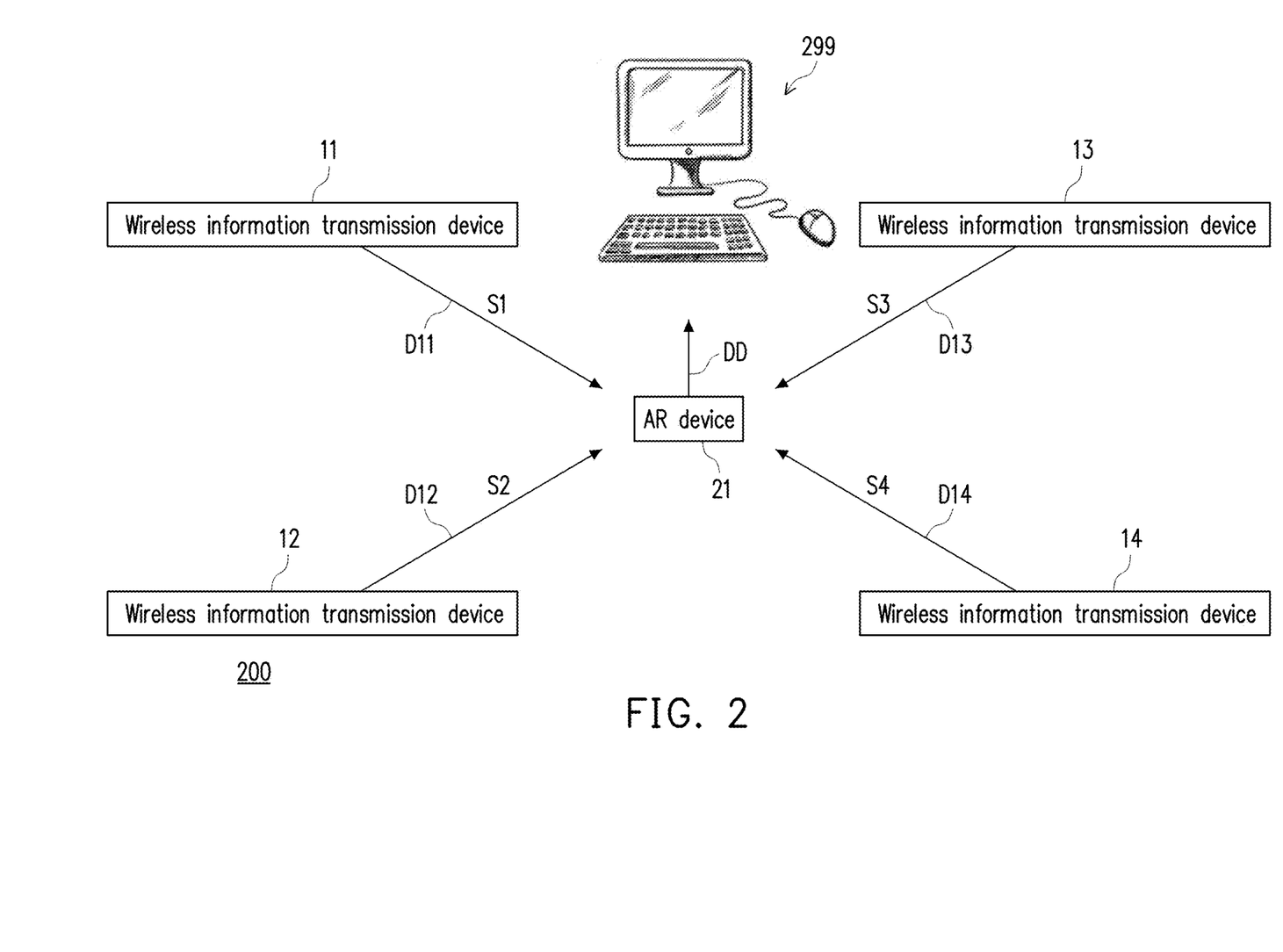
FIG. 2 is a schematic view of an AR information transmission system according to FIG. 1.

Please refer to FIG. 2. FIG. 2 is a schematic view of an AR information transmission system according to FIG. 1. As shown in FIG. 2, an AR information transmission system 200 may include the AR device 21 and a plurality of wireless information transmission devices 11 to 14.

In the present embodiment, if the wearer A of the AR device 21 faces toward a computer device 299 to operate the computer device 299, then the specific direction DD in which the AR device 21 receives a signal directs to the computer device 299. Under this circumstance, in order for the wearer A of the AR device 21 to watch the required AR information on the AR device 21 by only turning his head toward the wireless information transmission devices 11 to 14, the relative positions of the wireless information transmission devices 11 to 14 and the AR device 21 may be placed in the pattern as shown in FIG. 2, in which the wireless information transmission devices 11 to 14 are respectively configured to send wireless signals in designated directions toward the AR device 21.

Take the wireless information transmission device 11 for example. The orientation of the wireless information transmission device 11 may be adjusted so that the designated direction D11 in which the wireless information transmission device 11 sends the wireless signal S1 directs toward the AR device 21. Take the wireless information transmission device 12 for another example. The orientation of the wireless information transmission device 12 may be adjusted so that a designated direction D12 in which the wireless information transmission device 12 sends a wireless signal S2 directs toward the AR device 21. Take the wireless information transmission device 13 for another example. The orientation of the wireless information transmission device 13 may be adjusted so that a designated direction D13 in which the wireless information transmission device 13 sends a wireless signal S3 directs toward the AR device 21. Take the wireless information transmission device 14 for another example. The orientation of the wireless information transmission device 14 may be adjusted so that a designated direction D14 in which the wireless information transmission device 14 sends a wireless signal S4 directs toward the AR device 21.

Figure 3A:
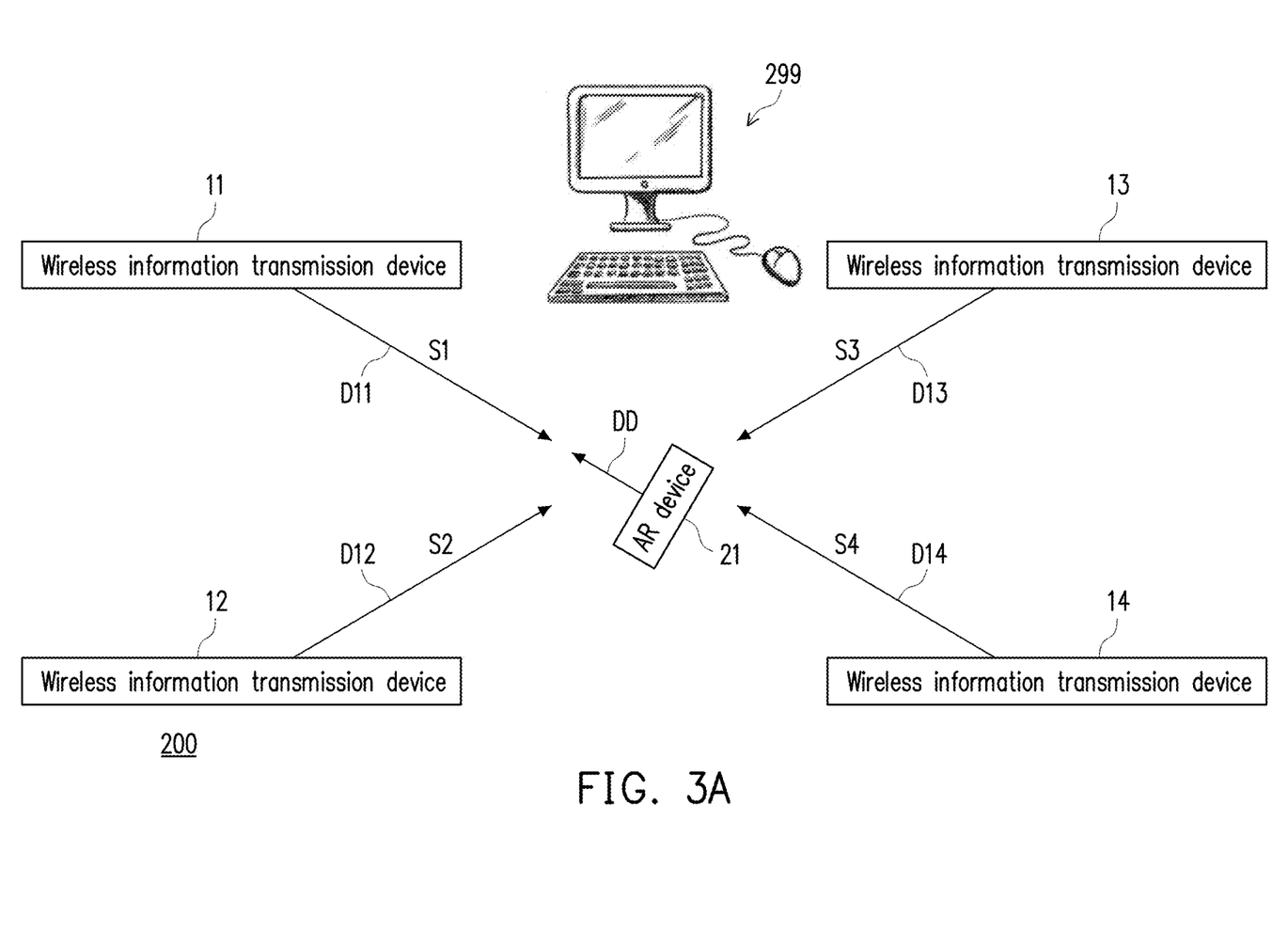
FIG. 3A is a schematic view of turning the direction of an AR device for receiving AR information according to FIG. 2.

For an easier understanding of the concept of the disclosure, hereinafter, FIG. 3A and FIG. 3B are further presented to explain the disclosure. Please refer to FIG. 3A. FIG. 3A is a schematic view of turning the direction of an AR device for receiving AR information according to FIG. 2. In the present embodiment, when the wearer A wants to watch the AR information AC1 provided by the wireless information transmission device 11 on the AR device 21, the wearer A may turn his head toward his left front to have the specific direction DD (i.e., the direction in which the directivity receiver 21a receives a signal) in which the AR device 21 receives a signal direct toward the designated direction D11.

Under this situation, the directivity receiver 21a of the AR device 21 may receive the wireless signal S1 from the wireless information transmission device 11, and the processor 21b of the AR device 21 may obtain the wireless signal S1 from the directivity receiver 21a and convert the wireless signal S1 into the AR information AC1. After that, the processor 21b may control the display 21c to display the AR information AC1. For example, the processor 21b may display the AR information AC1 on the lenses of the AR device 21 (such as the AR glasses) for the wearer A to watch.

Figure 3B:
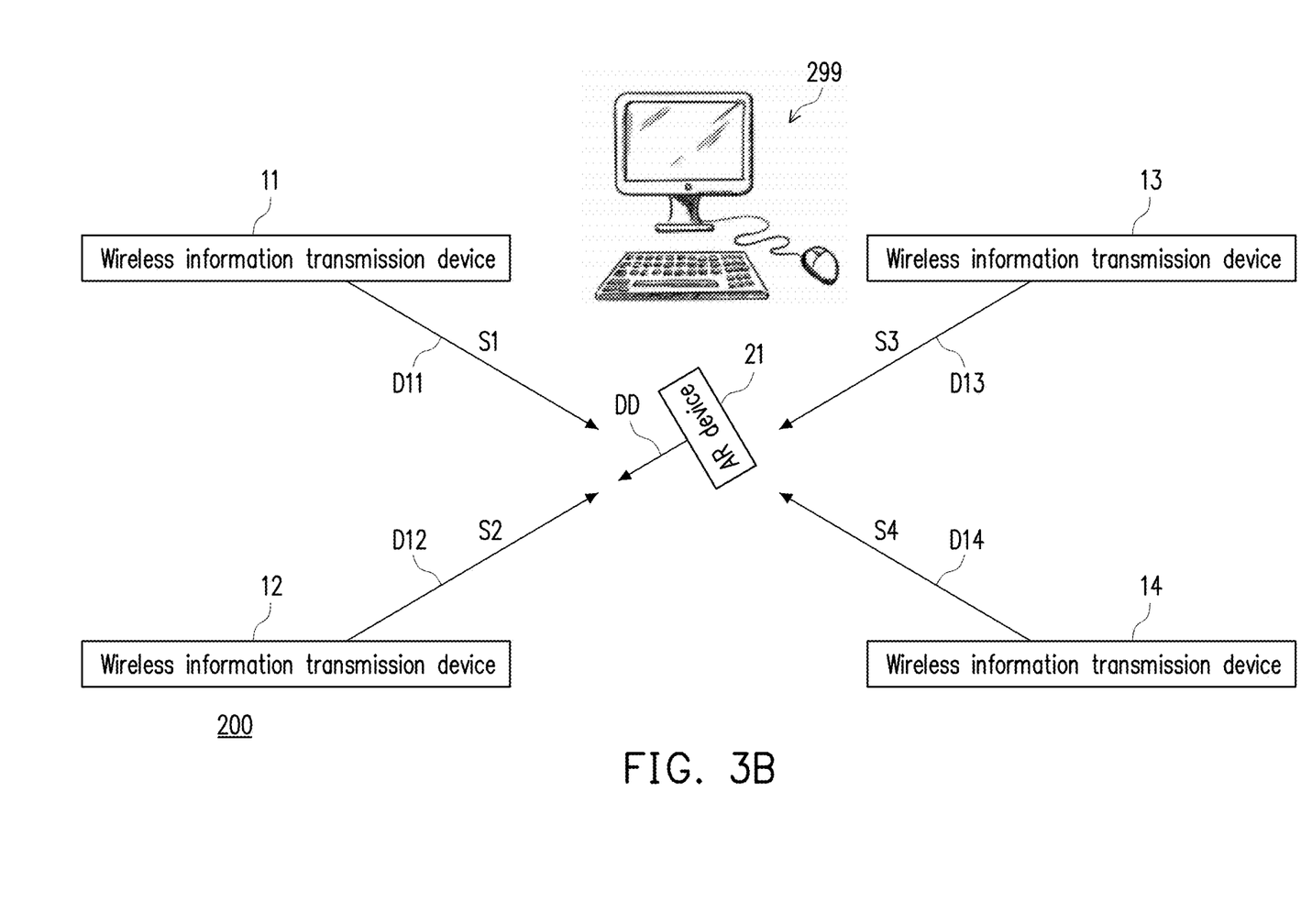
FIG. 3B is a schematic view of turning the direction of an AR device for receiving AR information according to FIG. 3A.

Please refer to FIG. 3B. FIG. 3B is a schematic view of turning the direction of an AR device for receiving AR information according to FIG. 3A. In the present embodiment, when the wearer A wants to watch the AR information provided by the wireless information transmission device 12 with the AR device 21 after the situation as shown in FIG. 3A, the wearer A may turn his head toward his left rear to have the specific direction DD (i.e., the direction in which the directivity receiver 21a receives a signal) in which the AR device 21 receives a signal direct toward the designated direction D12.

Under this situation, the directivity receiver 21a of the AR device 21 may receive the wireless signal S2 from the wireless information transmission device 12, and the processor 21b of the AR device 21 may obtain the wireless signal S2 from the directivity receiver 21a and convert the wireless signal S2 into corresponding AR information (not illustrated). After that, the processor 21b may control the display 21c to display the AR information corresponding to the wireless signal S2.

Similarly, when the wearer A wants to watch the AR information provided by the wireless information transmission device 13 on the AR device 21, the wearer A may turn his head toward his right front to have the specific direction DD (i.e., the direction in which the directivity receiver 21a receives a signal) in which the AR device 21 receives a signal direct toward the designated direction D13. Also, when the wearer A wants to watch the AR information provided by the wireless information transmission device 14 on the AR device 21, the wearer A may turn his head toward his right rear to have the specific direction DD (i.e., the direction in which the directivity receiver 21a receives a signal) in which the AR device 21 receives a signal direct toward the designated direction D14.

In other words, for the wearer A of the AR device, when he wants to watch the AR information provided by a certain wireless information transmission device on the AR device 21, the wearer A only needs to turn his head toward a designated direction in which the certain wireless information transmission device sends a signal to have the specific direction DD in which the AR device 21 receives a signal direct toward the designated direction. And when the wearer A wants to watch the AR information provided by another wireless information transmission device, the wearer A only needs to turn his head toward a designated direction in which the another wireless information transmission device sends a signal to have the specific direction DD in which the AR device 21 receives a signal direct toward the designated direction.

In addition, when the wearer A turns his head back again to the computer device 299, since the AR device 21 can no longer receive any wireless signals from the wireless information transmission devices 11 to 14, the AR device 21 may stop displaying the AR information so that the wearer A may normally operate the computer device 299, but the disclosure is not limited thereto.

Based on the above, compared to the known ways of switching AR information by the wearer manually or by voice, the disclosure enables the wearer A of the AR device 21 to switch the AR information he wants to watch in an intuitive and simple way with low latency. By doing so, the wearer A may feel the novel experience of switching AR information seamlessly.

In addition, the known AR device is usually configured with an arithmetic unit, a storage unit, a logic unit, and the likes of the more complicated circuit elements to deal with a higher demand of operands, which leads to issues such as too large an overall appearance and the difficulty in heat dissipation. However, since the AR device 21 of the disclosure only needs to passively present the corresponding AR information according to the received wireless signals, the AR device 21 of the disclosure may not require to be configured with the arithmetic unit, the storage unit, the logic unit, and the likes of circuit elements, which leads to a smaller volume and a better heat dissipation.

Also, since each of the wireless transmission device of the disclosure may provide the AR information updated through the Internet, the disclosure presents more variabilities compared with the known means which provides information via QR codes or text image encoding.

And since each wireless transmission device may be placed freely according to the environment and usage habits of the user/wearer, the disclosure also provides a high degree of freedom in deployment. For example, the wireless information transmission device of the disclosure may also be configured to provide AR information relevant to driving (such as an image of a rear-view mirror, a vehicle backup image, driving navigation, driving status, road conditions, etc). Under this situation, the user may dispose the wireless information transmission device of the disclosure in transportations and vehicles.

It is assumed that the wearer A of the AR device 21 in FIG. 2 is in some car C and faces toward the front of the car C (instead of the computer device 299), the wireless information transmission device 11 and the wireless information transmission device 13 may respectively provide images taken by the rearview cameras disposed on the left and right sides of the car C.

More specifically speaking, the wireless information transmission device 11 on the left front of the wearer A may obtain the image taken by the rearview camera disposed on the left side of the car C as the AR information AC1, and, after converting the same into the wireless signal S1, send the wireless signal S1 toward the designated direction D11. Similarly, the wireless information transmission device 13 on the right front of the wearer A may obtain the image taken by the rearview camera disposed on the right side of the car C as the provided AR information AC1, and, after converting the same into the wireless signal S3, send the wireless signal S3 toward the designated direction D13.

Under this situation, when the wearer A wants to see the condition in the left rear of the car, the wearer A may turn his head to face toward the wireless information transmission device 11, so that the AR device 21 may receive the wireless signal S1. By doing so, the wearer A of the AR device 21 may view on the AR device 21 the image taken by the rearview camera disposed on the left side of the car C. Also, when the wearer A wants to see the condition in the right rear of the car, the wearer A may turn his head to face toward the wireless information transmission device 13, so that the AR device 21 may receive the wireless signal S3. By doing so, the wearer A of the AR device 21 may view on the AR device 21 the image taken by the rearview camera disposed on the right side of the car C. As a result, it is needless for the car C to be disposed with the left and right rear mirrors, thus reducing the wind resistance when the car C is moving.

In some embodiments, when the AR device 21 simultaneously receives multiple wireless signals sent by multiple wireless information transmission devices, the processor 21*b* of the AR device 21 may consider one of the wireless signals according to the priority of the wireless signals and neglect the other wireless signals.

For example, if the wireless information transmission device 11 and the wireless information transmission device 13 in FIG. 2 are respectively configured to provide a weather forecast and a caller identification, since the caller identification has a higher urgency than the weather forecast, the wearer A may set in advance the priority of the wireless signal S3 provided by the wireless information transmission device 13 to be higher than the wireless signal S1 provided by the wireless information transmission device 1 via relevant software. In addition, it is assumed that the wireless information transmission device 11 and the wireless information transmission device 13 are both placed in the left front of the wearer A due to some reason and are sending the wireless signals S1 and S3 toward the AR device 21. Under this situation, when the wearer A turns his head to have the AR device 21 face toward the left front, the AR device 21 may simultaneously receive the wireless signals S1 and S3.

However, since the wireless signal S3 (corresponding to the caller identification) has a priority higher than that of the wireless signal S1 (corresponding to the weather forecast), the processor 21*b* of the AR device 21 may convert only the wireless signal S3 into the corresponding AR information and neglect the wireless signal S1. Then, the AR device 21 may correspondingly display the AR information corresponding to the wireless signal S3. But the disclosure is not limited thereto.

It should be understood that, although FIG. 2, FIG. 3A, and FIG. 3B only illustrate four wireless information transmission devices 11 to 14, the above embodiments are merely for exemplification and are not intended to limit the possible embodiments of the disclosure. In other embodiments, a designer may dispose more/fewer wireless information transmission devices in the environment of the wearer A according to the actual need, and the relative positions of each of the wireless information transmission devices and the AR device 21 may be adjusted according to the need of the designer, and the disclosure is not limited to the patterns shown in FIG. 2, FIG. 3A, and FIG. 3B.

Figure 4:
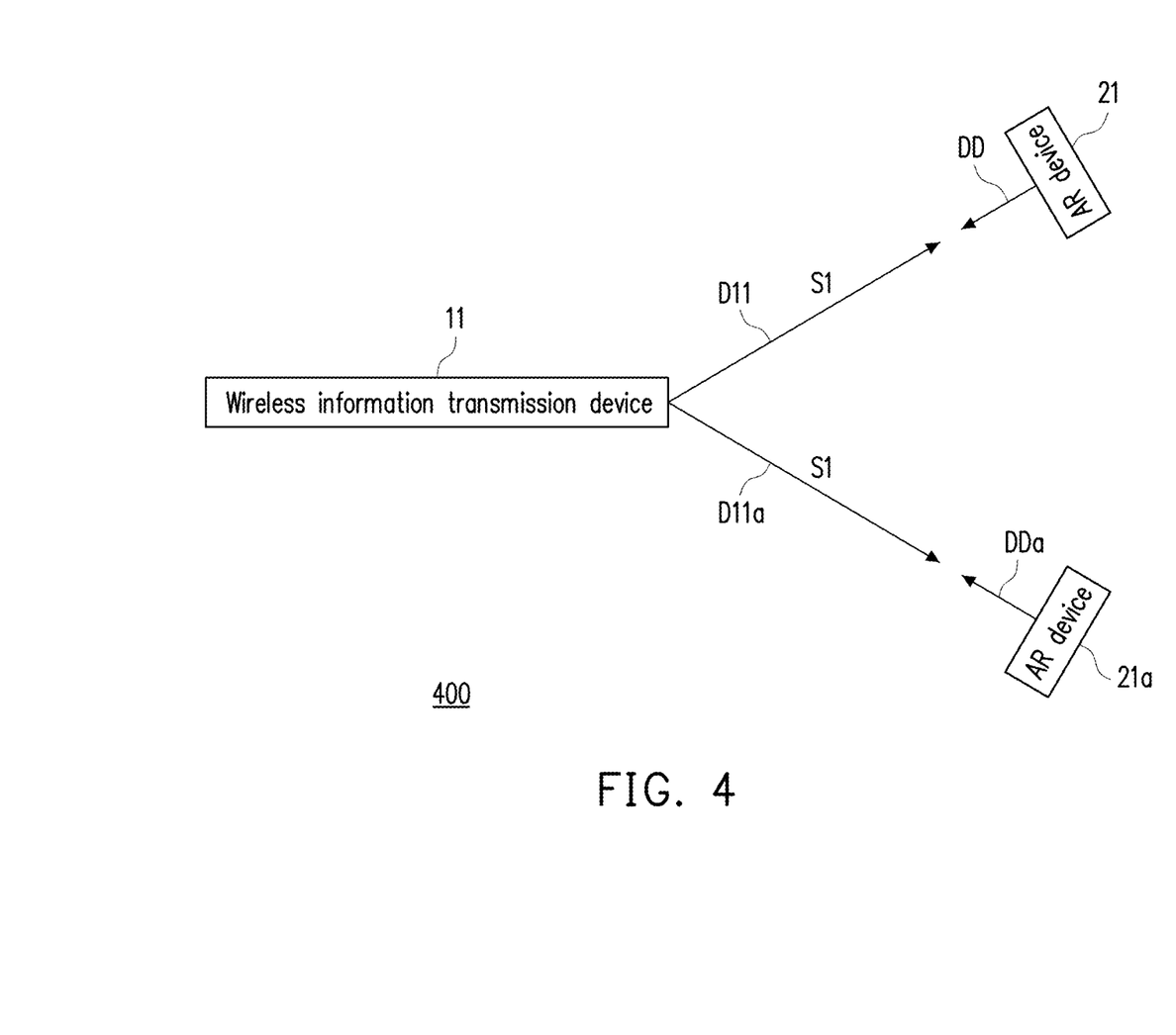
FIG. 4 is a schematic view of an AR information transmission system according to FIG. 1.

Please refer to FIG. 4. FIG. 4 is a schematic view of an AR information transmission system according to FIG. 1. As shown in FIG. 4, an AR information transmission system 400 may include the wireless information transmission device 11 and a plurality of AR devices 21 and 21*a*. In the present embodiment, it is assumed that the wireless information transmission device 11 may simultaneously send the wireless signal S1 corresponding to the AR information AC1 toward a plurality of designated directions D11 and D11*a*. Under this situation, when the wearer A of the AR device 21 faces toward the designated direction D11 (i.e, the specific direction DD in which the AR device 21 receives a signal directs to the designated direction D11), the AR device 21 may receive the wireless signal S1, thereby presenting the AR information AC1 for the wearer A to watch.

Similarly, when the wearer (hereinafter a wearer B) of the AR device 21*a* faces toward the designated direction D11*a* (i.e, a specific direction DDa in which the AR device 21*a* receives a signal directs to the designated direction D11*a*), the AR device 21*a* may similarly receive the wireless signal S1, thereby presenting the AR information AC1 for the wearer B to watch.

By doing so, the wireless information transmission device 11 in FIG. 4 may simultaneously provide the AR information AC1 to multiple AR devices, thereby having multiple wearers to watch the AR information AC1 simultaneously. In a scenario, the wireless information transmission device 11 may be disposed, for example, next to an exhibit in an exhibition, and the provided AR information AC1 may be information relevant to the exhibit. By doing so, when the wearers A and B of the AR devices 21 and 21*a* respectively face toward the designated directions D11 and D11*a*, the wearers A and B may respectively watch the information relevant to the exhibit on the AR devices 21 and 21*a*. By doing so, the disclosure may provide a way of information presentation distinct from the known tour guide machine, thereby having the wearers A and B acquire a better exhibition-viewing experience.

It should be understood that, although FIG. 4 only illustrates two AR devices 21 and 21*a* to explain the disclosure, in some embodiments, the wireless information transmission device 11 may also simultaneously send the wireless signal S1 toward more designated directions to enable more wearers of the AR devices (for example, the visitors who surround an exhibit) to watch the AR information AC1, but the disclosure is not limited thereto.

Figure 5:
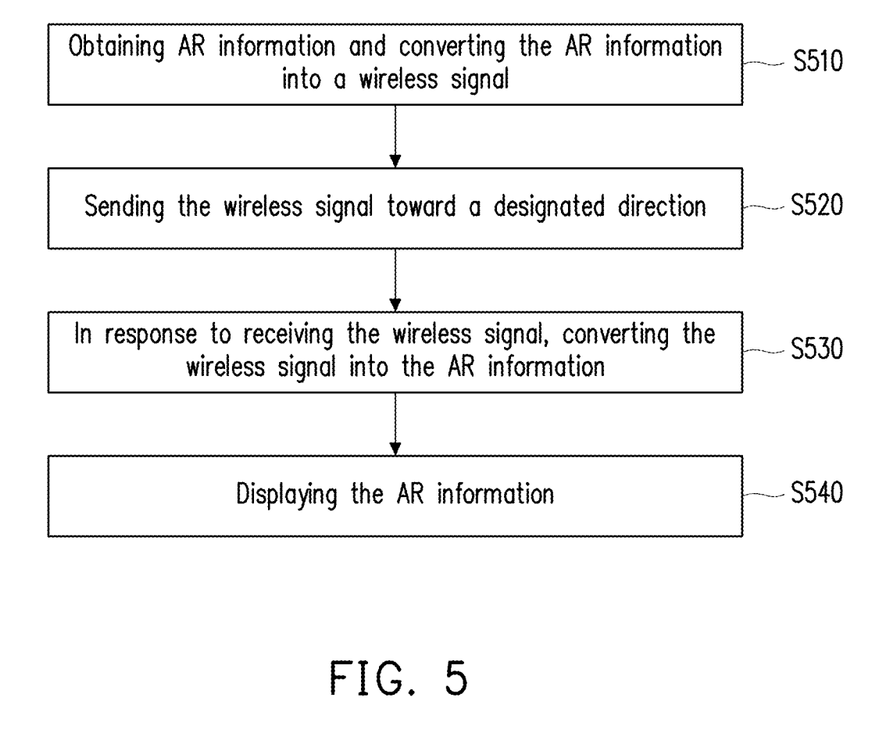
FIG. 5 is a flow chart of an AR information transmission method according to an embodiment of the disclosure.

Please refer to FIG. 5. FIG. 5 is a flow chart of an AR information transmission method according to an embodiment of the disclosure. The method of the embodiment may be performed by the AR information transmission system 100 of FIG. 1. The details of each step of FIG. 5 are described below with reference to the elements shown in FIG. 1.

First, in step S510, the wireless information transmission device 11 may obtain the AR information AC1 and convert the AR information AC1 into the wireless signal S1. In step S520, the directivity transmitter 11*a* of the wireless information transmission device 11 may send the wireless signal S1 toward the designated direction. In step S530, in response to the directivity receiver 21*a* receiving the wireless signal S1, the processor 21*b* may convert the wireless signal S1 into the AR information AC1. In step S540, the processor 21*b* may control the display 21*c* to display the AR information AC1.

For details of the above steps, reference may be made to the descriptions in the previous embodiments, and details are not described herein.

Based on the above, since the wireless information transmission device of the disclosure may send the wireless signal corresponding to the AR information toward the designated direction via the directivity transmitter, the wearer only needs to adjust the specific direction in which the AR device receives a signal to match the designated direction to receive the wireless signal, and the corresponding AR information is presented for the wearer to watch. Therefore, compared with the known ways of switching AR information by the wearer manually or by voice, the disclosure enables the wearer of the AR device to switch the AR information he wants to watch in an intuitive and simple way with low latency and thus feel the novel experience of switching AR information seamlessly.

Although the disclosure has been disclosed by the above embodiments, it will be apparent to one of ordinary skill in the art that modifications to the described embodiments may be made without departing from the spirit of the scope or spirit of the disclosure. In view of the foregoing, the scope of the disclosure will be defined by the attached claims and their equivalents and not by the above detailed descriptions.

What is claimed is:

1. An augmented reality (AR) information transmission system, comprising:
   a first AR device, including a first directivity receiver, a first display, and a third processor coupled to the first directivity receiver and the first display, wherein the first directivity receiver receives a signal from a specific direction;
   a first wireless information transmission device, comprising:
      a first directivity transmitter; and
      a first processor, coupled to the first directivity transmitter, and configured to:
         obtain a first AR information and convert the first AR information into a first wireless signal; and
         control the first directivity transmitter to send the first wireless signal toward a first designated direction; and
   a second wireless information transmission device, comprising:
      a second directivity transmitter; and
      a second processor, coupled to the second directivity transmitter, and configured to:
         obtain a second AR information and convert the second AR information into a second wireless signal; and
         control the second directivity transmitter to send the second wireless signal toward at least one second designated direction,
   wherein in response to the specific direction of the first AR device is aligned with the first designated direction of the first directivity transmitter, the first AR device displays the first AR information based on receiving the first wireless signal,
   wherein in response to the first AR information is displayed on the first AR device, the first AR device stops displaying the first AR information by deviating the specific direction of the first AR device from the first designated direction of the first directivity transmitter,
   wherein the third processor of the first AR device is configured to:
      in response to determining that the first directivity receiver receives the first wireless signal, convert the first wireless signal into the first AR information; and
      control the first display to display the first AR information;
      in response to determining that the first wireless signal and the second wireless signal are simultaneously received, neglect one of the first wireless signal and the second wireless signal according to a priority of the first wireless signal and the second wireless signal;
      convert the other one of the first wireless signal and the second wireless signal into a corresponding specific AR information; and
      control the first display to display the specific AR information.

2. The AR information transmission system according to claim 1, wherein the third processor of the first AR device is further configured to:
   in response to determining that the first directivity receiver no longer receives the first wireless signal, control the first display to stop displaying the first AR information.

3. The AR information transmission system according to claim 1, wherein the third processor of the first AR device is configured to:
   in response to determining that the first directivity receiver receives the second wireless signal, convert the second wireless signal into the second AR information; and
   control the first display to display the second AR information.

4. The AR information transmission system according to claim 1, further comprising a second AR device, the second AR device comprising:
   a second directivity receiver for receiving a signal from a second specific direction;
   a second display; and
   a fourth processor, coupled to the second directivity receiver and the second display, and configured to:
      in response to determining that the second directivity receiver receives the first wireless signal, convert the first wireless signal into the first AR information; and
      control the second display to display the first AR information.

5. The AR information transmission system according to claim 1, wherein the first AR device comprises a pair of AR glasses, and the first directivity receiver is disposed on a front side of the pair of AR glasses, and the first specific direction is a front of the pair of AR glasses.

6. An augmented reality (AR) information transmission method, comprising:
   using a first directivity receiver of a first AR device to receive a signal from a specific direction;
   obtaining a first AR information and converting the first AR information into a first wireless signal by a first wireless information transmission device;
   sending the first wireless signal toward a first designated direction by a first directivity transmitter of the first wireless information transmission device;
   in response to determining that the first directivity receiver of the first AR device receives the first wireless signal, converting the first wireless signal into the first AR information by the first AR device; and
   displaying the first AR information by a first display of the first AR device;
   in response to determining that the specific direction of the first AR device is aligned with the first designated direction of the first directivity transmitter, the first AR device displays the first AR information based on receiving the first wireless signal;
   in response to determining that the first AR information is displayed on the first AR device, the first AR device stops displaying the first AR information by deviating the specific direction of the first AR device from the first designated direction of the first directivity transmitter;

obtaining a second AR information and converting the second AR information into a second wireless signal by a second wireless information transmission device; and sending the second wireless signal toward at least one second designated direction by a second directivity transmitter of the second wireless information transmission device;

in response to determining that the first wireless signal and the second wireless signal are simultaneously received, neglecting one of the first wireless signal and the second wireless signal by the first AR device according to a priority of the first wireless signal and the second wireless signal;

converting the other one of the first wireless signal and the second wireless signal into a corresponding specific AR information by the first AR device; and displaying the specific AR information by a first display of the first AR device.

7. The AR information transmission method according to claim 6, further comprising:

in response to determining that the first directivity receiver no longer receives the first wireless signal, stopping displaying the first AR information by the first display.

8. The AR information transmission method according to claim 6, further comprising:

in response to determining that the first directivity receiver receives the second wireless signal, converting the second wireless signal into the second AR information by the first AR device; and displaying the second AR information by the first display.

9. The AR information transmission method according to claim 6, further comprising:

in response to determining that a second directivity receiver of a second AR device receives the first wireless signal, converting the first wireless signal into the first AR information by the second AR device; and displaying the first AR information by a second display of the second AR device.

* * * * *